Dec. 15, 1970 W. F. SHUTLER 3,548,176
PROBABLE FUTURE ERROR DETECTOR
Filed Jan. 18, 1968

INVENTOR
WILLIAM F. SHUTLER

BY Sughrue, Rothwell, Mion, Zinn & Macpeak
ATTORNEYS 3,548,176

PROBABLE FUTURE ERROR DETECTOR

William F. Shutler, Wappingers Falls, N.Y., assignor to International Business Machines Corporation, a corporation of New York Filed Jan. 18, 1968, Ser. No. 698,896
Int. Cl. G11c 29/00; G06f 11/00
U.S. Cl. 235—153 9 Claims

ABSTRACT OF THE DISCLOSURE

In a computer including a storage array for providing microprogram control words, a line of the array is monitored for noise of sufficient level to probably cause an error in the array output word.

BACKGROUND OF THE INVENTION

In present day computer systems the speed of operation is an important consideration in the attainment of goals requiring complex and/or multiple computations. Science and technology have greatly improved computer speed and consequently computer capabilities by providing new components which switch at extremely rapid rates. Generally, the high speed elements are smaller than their older, slower counterparts and require lower level voltages and currents to operate them. Although there are obvious advantages in the use of low level voltages and currents, one of the disadvantages is in the fact that the signals can be masked by lower level noise causing possible computer errors. Computer errors are handled in various ways. The basic way of handling errors is to detect a malfunction after it happens and either bring the computer to a hard stop or restart the computer program at some predetermined point. A check routine can perform the function of running a check of the computer elements to detect where the failure occurred. Another known method is to restart the program at a predetermined point in response to a voltage change on the power supply lines above a preset minimum. Restarting a program or bringing a computer to a hard stop is a time consuming operation which cuts down greatly on the efficiency of high speed computers.

SUMMARY OF THE INVENTION

In accordance with the present invention means are provided for detecting not errors but error causing perturbations prior to the occurrence of errors thereby allowing an error prevention apparatus to cause the computer to pause in its operation until the error causing perturbations has disappeared. A specific system for pausing a computer in response to a probable future error signal generated by the present invention is described and claimed in a commonly assigned copending application Ser. No. 698,905 entitled "Computer Error Anticipator and Cycle Extender" by Hartlipp et al., filed Jan. 18, 1968 (PO-967,070). The latter application describes the invention in connection with a specific type of computer, one which includes a microprogram control store. In accordance with the present invention, a probable future error signal is generated by sensing the noise level on an unused sense line of the read-only storage array. Sufficiently high level noise caused by static discharge may alter the read-only store output word thereby causing a control error in the computer cycle which is controlled by the altered output word. It has been discovered that the latter noise will show up on an unused sense line in the array of the read-only store and thus, monitoring the level of noise on an unusued sense line provides an indication of probable future error. The probable error is a future one because each read-only store word is sensed prior to the time it controls computer operation.

In the specific embodiment described and shown in the drawings, the invention is illustrated in conjunction with a read only store for providing microprogram words to a computer. However, it will be appreciated by anyone having ordinary skill in the art that the basic invention involved herein is the use of a line in a storage array to detect probable error in the storage array output word and that it is equally applicable to destructive and non-destructive read out storage arrays. Furthermore, it should be noted that although the invention, in its broadest aspect, is not limited to the environment of a computer controlling storage array, when it is used in such an environment, the electronic indication of a "probable error" in the storage array output word is also an indication of a "probable future error" in the computer cycle.

DETAILED DESCRIPTION OF THE DRAWINGS

Computers to which the present invention are particularly adaptable are well known; one such computer as described in: IBM Manual Form 223-2821-0, Copyright 1966 and IBM Manual Form 223-2822-0, Copyright 1965. Only that part of the latter type of computer which is helpful in understanding the specific embodiment described herein will be mentioned.

Figure 1:
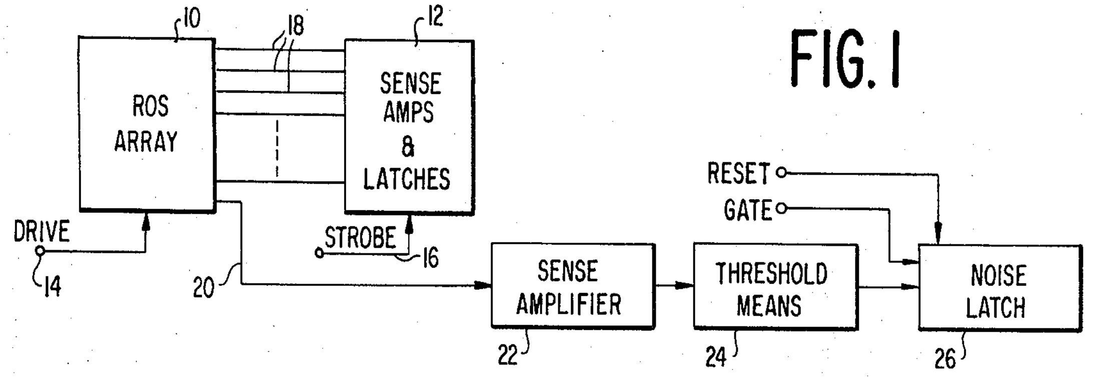
FIG. 1 is a block diagram of a preferred embodiment of the present invention.
Figures 2, 3, 4:
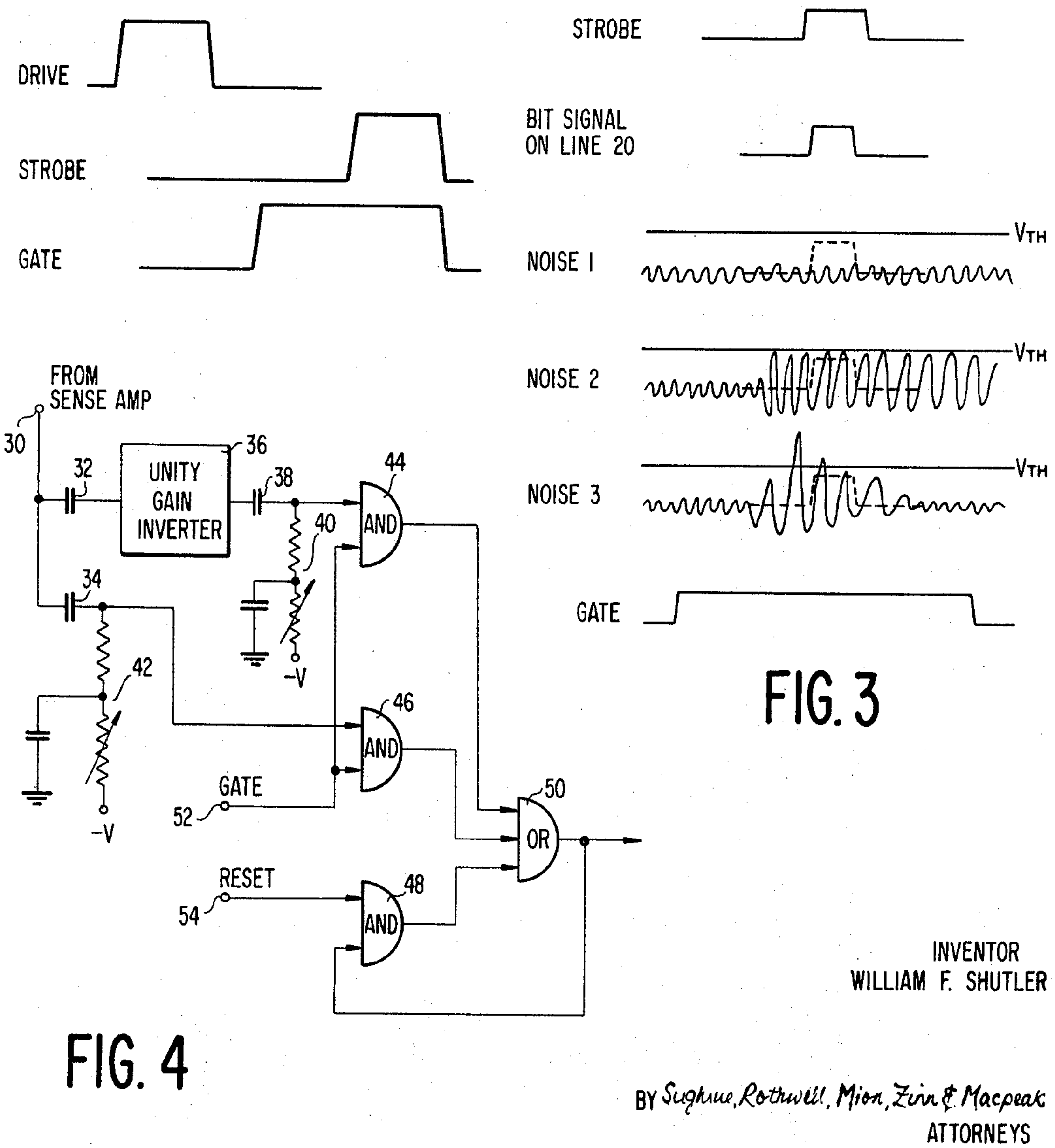
FIGS. 2 and 3 are timing diagrams helpful in understanding FIG. 1.
FIG. 4 is a more detailed illustration of a portion of FIG. 1.

FIG. 1 illustrates a block diagram of the preferred embodiment of the present invention. The read-only storage (ROS) array 10 is a capacitive storage matrix in which binary words are stored. When the addressed drive line of the array is energized by a drive pulse on terminal 14 the addressed word appears in parallel on the sense line output 18. The sense lines are connected to sense amplifiers and latches 12 which receive the bits of the addressed word under control of a strobe pulse on terminal 16. The time relation between the drive, strobe and gate pulses is illustrated in FIG. 2. The strobe pulse is delayed from the drive pulse an amount of time sufficient to allow the addressed word to appear at the output ends of the sense lines. All of the latter pulses may be generated by a main clock in combination with delay means, and for the computer described in the above references, the latter pulses occur during a time referred to as the ROS cycle. Each ROS cycle occurs during the latter part of each CPU cycle, as shown in the patent application referred to above. The addressed word sensed during CPU cycle N is gated into an ROS data register, not shown, at the beginning of CPU cycle $N+1$ for controlling CPU operation during cycle $N+1$.

In the present invention, one of the sense lines of the array, indicated by line 20 of FIG. 1, is arranged to provide the same bit of information no matter what drive line is energized. This can be done simply by arranging the capacitive connections between sense line 20 and all of the drive lines so that when the array is driven, the sense line 20 always registers a binary one or always registers a binary zero.

Since all of the sense lines in the array will be similarly affected by noise, the normally unused sense line 20 becomes a vehicle for detecting noise on all sense lines. The noise plus bit signal on line 20 is sensed by a sensing amplifier 22, which may be a transistorized amplifier sensitive to low level signals, and applied to a noise latch 26 via threshold means 24. The threshold means is set so that the noise latch 26 will be set during the gate period only if the noise is above a preset level. Since the bit signal on line 20 will always be the same (at strobe time) the only variable is the level of the noise. As will be described below, the threshold level is set at a value such that any noise level in the array 10 likely to cause an error in the addressed word strobed into the sense amplifiers and latches 12 is sufficient to set the latch. Since the word entered into sense amplifier and latches 12 controls computer operation during the next cycle, the output of the threshold means 24 which is sufficient to set the latch 26 is referred to as a probable future error signal.

In a particular operation of the present invention the line of the array used for sensing error-causing noise actually was a line layed out in the array for original use as a sense line. However, it will be readily apparent that, any additional line within the storage array may be used to sense the error-causing noise. The line used in the manner indicated will hereafter be referred to as a dummy sense line.

The noise may have the same polarity or the opposite polarity as the bit signal and the threshold means 24 responds to either polarity noise. Examples of the noise and the time relations between the strobe and gate pulses and bit signal is illustrated in FIG. 3. The bit signal on line 20 is illustrated as a positive pulse during strobe time, but it will be apparent that the polarity of the bit signal is unimportant to the invention provided it is the same for all addressed words. The noise 1, noise 2 and noise 3 waveforms represent three different noise examples with the bit signal superimposed thereon in dashed lines. In the waveforms the relative amplitudes are not drawn according to actual conditions but are drawn only to illustrate the timing of noise detection. The noise 1 waveform represents the normal machine running noise and the threshold level is set to prevent running noise from setting the latch 26. The noise 2 waveform illustrates noise occurring at a level which will set the latch 26. The threshold voltage $V_{TH}$ is set to respond to $V_{bit}+V_{NT}$ where $V_{NT}$ is the noise level likely to cause an error in the sensed word on sense lines 18. Since it is desirable to detect noise during the time that the output word is being sensed it is necessary to have the gate pulse encompass the strobe pulse time. However, as shown in FIG. 2, the gate pulse starts prior to the strobe pulse.

The threshold means is set at a value which causes an output therefrom to set the latch when the input voltage $V_{in}$ is equal or greater than $V_{TH}$, the latter being a threshold level. During the time that the bit signal is on the sense line the threshold means $V_{in}=V_{bit}+V_{noise}$. At other times $V_{in}=V_{noise}$ only. The purpose of this is to cause the latch to be set under some conditions when the noise plus bit signal is below the threshold level, but the noise alone, just prior to the bit signal occurrence, is above the threshold level. This is indicated by the noise 3 waveform which is a damped sinusoid.

An example of the threshold means and noise latch is illustrated in FIG. 4. The output of the sense amplifier 22 appearing at terminal 30 is applied to the threshold means which comprises unity inverter 36 and variable resistance threshold setting circuits 40 and 42, via coupling capacitors 32, 34 and 38. The inverter 36 inverts the polarity of the input thereto and operates with circuit 40 to set the latch when the noise is negative and at the desired level. The circuit 42 operates to set the latch when the noise is positive and at the required level.

The latch comprises AND gate 44 and 46 and OR gate 50. An output from OR gate 50 indicates that there is a probable future error. This output corresponds to the output from the noise latch in the above mentioned copending patent application and may be used as described therein to pause the computer.

Since the noise level which will cause errors in the output word varies from system to system there is no single threshold level which will serve for all computers. In practice even the same computer may require a different threshold level depending upon such factors as the ground integrity between system frames, I/O population and configuration, power line input configuration. One method of setting the threshold is as follows:

With the noise latch disabled, run the computer and generate additional noise while monitoring errors. The errors can be monitored by parity checking the output word of the ROS array. The noise can be generated by using a cyclic electrostatic discharge device which periodically charges a capacitor to a voltage and discharges the capacitor into a resistive probe which may be touching the chassis which houses the ROS array. Since static discharge induced noise is the main problem at which the present invention is directed, this method of intentionally generating noise satisfactorily represents the undesirable conditions which it is desired to protect against. The voltage of the discharge device is then increased until the parity check device indicates errors in the output word. With the discharge device operating at the error causing voltage and the noise latch enabled, the threshold circuit is adjusted down from a maximum level to a point where the noise latch will be set. The positive and negative threshold circuits can be set separately by disconnecting one when the other is being set. The threshold level is then lowered slightly to provide a fargin of safety. It will be appreciated by those skilled in the art that the margin of safety is not critical. If the threshold is not lowered from that level which sets the noise latch during the above described test, then the probability that an error will occur when the noise latch sets is very high. However, if the threshold is lowered the probability that an error would occur when the noise latch is set is lowered somewhat, but chance that all errors in the ROS output word will be detected is greater.

Since capacitive storage arrays are well known in the art, none will be described in edtail herein. However, it may be noted that in the computer, described in the above mentioned references, for which the specific embodiment of the present invention was designed, the ROS array of the known type in which each drive line and each sense line has a balance line associated therewith. Each sense amplifier of the sense amplifier group 12 is a differential amplifier with common mode rejection and the sense amplifier 22 is a linear amplifier with no common mode rejection.

While the invention has been particularly shown and described with reference to a preferred embodiment thereof, it will be understood by those skilled in the art that various changes in form and details may be made therein without departing from the spirit and scope of the invention.

What is claimed is:

1. In a computer of the type having a microprogram control store for providing output words to control computer operation, the invention comprising means for detecting probable next cycle computer error, said means comprising, a dummy sense line in said control store and means responsive to the noise level on said sense line for indicating when said noise level exceeds a predetermined level, said indication being indicative of the probability of error.

2. In a computer having a microprogram control store for controlling computer operation, said control store having drive lines and sense lines forming a storage array, a dummy sense line in said array associated with said drive lines to produce the same information signal for all addressed words of said array, means for sensing the voltage on said dummy sense line, and means responsive to the output of said sensing means for indicating when the noise on said dummy sense line is of a predetermined level which is likely to cause an error in the information read out of said array.

3. In a computer as claimed in claim 2, said means for indicating comprising latching means adapted to be set by a trigger during a period encompassing the time in which a word from said array is being read out, and threshold means responsive to said sensing means output for providing a trigger to said latching means when the voltage on said sense line is equal to or greater than the sum of an information bit plus noise of said predetermined level.

4. In a computer of the type having a memory comprising drive and sense lines, an output receiving means energized by a strobe pulse for receiving an addressed output word from said memory, said output word controlling the computer operation during the following computer cycle, the invention comprising a dummy sense line of said memory not carying a part of said output word and means responsive to the voltage on said dummy line for indicating when the noise in said memory is likely to cause an error in the next cycle of the computer, said means including, means for indicating when said voltage on said dummy line is above a preset level, said indication indicating the probability of error.

5. In a computer as claimed in claim 4, said dummy sense line being connected to said drive lines to provide the same information signal output in response to any drive line being energized.

6. In a computer as claimed in claim 5 wherein said means for providing comprises a linear sense amplifier for sensing the voltage on said dummy sense line, and threshold means for detecting when the output of said sense amplifier is above a preset level corresponding to probable error causing noise plus information signal.

7. In a computer as claimed in claim 6, said threshold detecting means having a preset level which detects when discharge induced noise in said memory will probably cause an error in said memory output word.

8. A system for detecting probable errors in information extracted from a storage array comprising, a dummy sense line in said array, means for detecting noise on said sense line having a level likely to cause error in said extracted information during the read out of information from said array, and means for indicating when said noise is of a level likely to cause said error.

9. A system for detecting probable errors in words read out of a memory of the type comprising a plurality of sense and drive lines forming a matrix and interconnected at selected points by capacitors to provide stored words, a word being read out by driving a drive line and strobing the sense lines carrying the bits of the word, said system comprising, at least one additional sense line connected in said matrix to carry the same bit signal no matter what drive line is energized, sensing means for detecting the voltage on said additional sense line and threshold means responsive to the output of said sensing means for indicating when the noise on said sense line during the time between driving said drive lines and ending the strobe of said sense lines was caused by a discharge likely to have caused an error in the output word.

References Cited

UNITED STATES PATENTS

| | | | |
|---|---|---|---|
| 2,756,409 | 7/1956 | Lubkin | 340—146.1X |
| 3,386,079 | 5/1968 | Wiggins | 325—42X |
| 3,391,344 | 7/1968 | Goldberg | 325—42X |
| 3,214,700 | 10/1965 | Hook | 340—253X |

OTHER REFERENCES

Ashley & Dohler, Solving Noise Problems in Digital Computer Memories, Electronics, Mar. 25, 1960, pp. 72, 73, 74.

Womack, Schmoo Plot Analysis of Coincident-Current Memory Systems, IEEE Transactions on Electronic Computers, February 1965, pp. 36–44.

EUGENE G. BOTZ, Primary Examiner

C. E. ATKINSON, Assistant Examiner

U.S. Cl. X.R.

340—174